US012137327B2

(12) United States Patent
Lehtiniemi et al.

(10) Patent No.: US 12,137,327 B2
(45) Date of Patent: Nov. 5, 2024

(54) MONITORING OF AUDIO SIGNALS

(71) Applicant: Nokia Technologies Oy, Espoo (FI)

(72) Inventors: Arto Juhani Lehtiniemi, Lempaala (FI); Miikka Tapani Vilermo, Siuro (FI); Mikko Olavi Heikkinen, Tampere (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 190 days.

(21) Appl. No.: 17/858,206

(22) Filed: Jul. 6, 2022

(65) Prior Publication Data

US 2023/0011986 A1 Jan. 12, 2023

(30) Foreign Application Priority Data

Jul. 9, 2021 (EP) .................................... 21184688

(51) Int. Cl.

| | |
|---|---|
| ***H04R 29/00*** | (2006.01) |
| ***G10K 11/178*** | (2006.01) |
| ***H04R 1/40*** | (2006.01) |
| ***H04R 3/00*** | (2006.01) |
| ***H04R 3/04*** | (2006.01) |
| ***H04R 5/02*** | (2006.01) |
| ***H04R 5/04*** | (2006.01) |
| ***H04S 7/00*** | (2006.01) |

(52) U.S. Cl.

CPC ..... *H04R 29/005* (2013.01); *G10K 11/17825* (2018.01); *G10K 11/17875* (2018.01); *H04R 1/406* (2013.01); *H04R 3/005* (2013.01); *H04R 3/04* (2013.01); *H04R 5/02* (2013.01); *H04R 5/04* (2013.01); *H04S 7/30* (2013.01); *G10K 2210/3026* (2013.01); *H04R 2430/01* (2013.01); *H04S 2400/11* (2013.01); *H04S 2400/15* (2013.01)

(58) Field of Classification Search

CPC ...... H04R 29/005; H04R 1/406; H04R 3/005; H04R 3/04; H04R 5/02; H04R 5/04; H04R 2430/01; H04S 7/30; H04S 2400/11; H04S 2400/15; G10K 11/17825; G10K 11/17875; G10K 2210/3026

See application file for complete search history.

(56) References Cited

U.S. PATENT DOCUMENTS

| | | | | |
|---|---|---|---|---|
| 2009/0238377 A1* | 9/2009 | Ramakrishnan ....... | H04R 3/005 381/92 |
| 2022/0139392 A1* | 5/2022 | Kim ....................... | H04R 3/005 704/275 |

* cited by examiner

*Primary Examiner* — David L Ton

(74) *Attorney, Agent, or Firm* — Harrington & Smith

(57) ABSTRACT

An apparatus and method for monitoring audio output is disclosed. The apparatus may include circuitry configured for providing one or more primary audio signals based on signals from one or more first microphones associated with an audio capture device and providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers. The apparatus may include circuitry configured for modifying one or both of the primary and secondary audio signals such that output of the one or more primary audio signals are distinguished over output of the one or more secondary audio signals.

20 Claims, 6 Drawing Sheets

MONITORING OF AUDIO SIGNALS

FIELD

Example embodiments relate to an apparatus, method and computer program relating to monitoring of audio signals, for example monitoring of audio signals representing what is being captured by an audio capture device.

BACKGROUND

When capturing audio, for example using a mobile device having one or more microphones, a user may wish to monitor in real-time what is being captured in terms of the audio. For example, there may be unwanted noise in the captured audio due to environmental conditions, such as wind, and/or due to user handling. Based on the monitored audio, a user may be able to adjust the positioning or handling of the capture device so that unwanted noises are not captured or are at least mitigated in the captured audio.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: providing one or more primary audio signals based on signals from one or more first microphones associated with an audio capture device; providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers; and modifying one or both of the primary and secondary audio signals such that output of the one or more primary audio signals are distinguished over output of the one or more secondary audio signals.

The apparatus may further comprise means for monitoring one or more characteristics of one or both of the primary and secondary audio signals, wherein the modifying means is triggered to temporarily modify one or both of the primary and secondary audio signals based on the monitored one or more characteristics.

The monitoring means may be configured to monitor an amplitude of one or both of the primary and secondary audio signals, wherein the modifying means is triggered based on the monitored amplitude of one of the primary and secondary audio signals crossing a predetermined threshold.

The audio monitoring device may comprise means for performing noise cancellation processing on the signals from the one or more second microphones, the one or more secondary audio signals representing artefacts of the noise cancellation processing which are audible through the one or more loudspeakers.

The modifying means may be configured to disable noise cancellation processing.

The modifying means may be configured to disable the one or more second microphones.

The modifying means may be configured to modify an amplitude of one of the primary and secondary audio signals relative to the other one of the primary and secondary audio signals.

The modifying means may be configured to increase the amplitude of the one or more primary audio signals relative to the amplitude of the one or more secondary audio signals.

The one or more primary audio signals may represent spatial audio, the modifying means being configured to modify the spatial position at which the one or more primary audio signals are perceived when output through the one or more loudspeakers.

The apparatus may further comprise means for determining a receiving direction associated with the one or more secondary audio signals, wherein the modifying means may be configured to modify the spatial position such that the one or more primary audio signals are perceived when output through the one or more loudspeakers from a different direction than the receiving direction associated with the one or more secondary audio signals.

The apparatus may further comprise means for determining a direction or location of the audio capture device relative to the audio monitoring device, wherein the modifying means may be configured to modify the spatial positon such that the one or more primary audio signals are perceived when output through the one or more loudspeakers substantially from the direction or location of the audio capture device.

The modifying means may be configured to modify one or both of the primary and secondary audio signals by means of audio synthesis processing and/or by means of audio filtering so that at least some audio properties of one of the primary and secondary audio signals is or are modified in a differentiating way to that of the other one of the primary and secondary audio signals.

The modifying means may be configured to process one or both of the primary and secondary audio signals by means of a selected audio synthesis process and/or audio filter, the selection being based on characteristics of one or both of the primary and secondary audio signals.

The apparatus may be the audio monitoring device. The apparatus may comprise a set of earphones or headphones.

According to a second aspect, this specification describes a method, comprising: providing one or more primary audio signals based on signals from one or more first microphones associated with an audio capture device; providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers; and modifying one or both of the primary and secondary audio signals such that output of the one or more primary audio signals are distinguished over output of the one or more secondary audio signals.

The method may further comprise monitoring one or more characteristics of one or both of the primary and secondary audio signals, wherein the modification is triggered to temporarily modify one or both of the primary and secondary audio signals based on the monitored one or more characteristics.

The monitoring may monitor an amplitude of one or both of the primary and secondary audio signals, wherein the modification is triggered based on the monitored amplitude of one of the primary and secondary audio signals crossing a predetermined threshold.

The audio monitoring device may be configured to perform noise cancellation processing on the signals from the one or more second microphones, the one or more secondary audio signals representing artefacts of the noise cancellation processing which are audible through the one or more loudspeakers.

The modification may disable noise cancellation processing.

The modification may disable the one or more second microphones.

The modification may modify an amplitude of one of the primary and secondary audio signals relative to the other one of the primary and secondary audio signals.

The modification may increase the amplitude of the one or more primary audio signals relative to the amplitude of the one or more secondary audio signals.

The one or more primary audio signals may represent spatial audio, and the modification may modify the spatial position at which the one or more primary audio signals are perceived when output through the one or more loudspeakers.

The method may further comprise determining a receiving direction associated with the one or more secondary audio signals, wherein the modification may modify the spatial position such that the one or more primary audio signals are perceived when output through the one or more loudspeakers from a different direction than the receiving direction associated with the one or more secondary audio signals.

The method may further comprise determining a direction or location of the audio capture device relative to the audio monitoring device, wherein the modification may modify the spatial positon such that the one or more primary audio signals are perceived when output through the one or more loudspeakers substantially from the direction or location of the audio capture device.

The modification may modify one or both of the primary and secondary audio signals by means of audio synthesis processing and/or by means of audio filtering so that at least some audio properties of one of the primary and secondary audio signals is or are modified in a differentiating way to that of the other one of the primary and secondary audio signals.

The modification may process one or both of the primary and secondary audio signals by means of a selected audio synthesis process and/or audio filter, the selection being based on characteristics of one or both of the primary and secondary audio signals.

The method may be performed by the audio monitoring device, for example a set of earphones or headphones.

According to a third aspect, this specification describes a computer program comprising instructions for causing an apparatus to perform at least the following: providing one or more primary audio signals based on signals from one or more first microphones associated with an audio capture device; providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers; and modifying one or both of the primary and secondary audio signals such that output of the one or more primary audio signals are distinguished over output of the one or more secondary audio signals.

Example embodiments may also provide any feature of the second aspect.

According to a fourth aspect, this specification describes a computer-readable medium (such as a non-transitory computer-readable medium) comprising program instructions stored thereon for performing at least the following: providing one or more primary audio signals based on signals from one or more first microphones associated with an audio capture device; providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers; and modifying one or both of the primary and secondary audio signals such that output of the one or more primary audio signals are distinguished over output of the one or more secondary audio signals.

According to a fifth aspect, this specification describes an apparatus comprising: at least one processor; and at least one memory including computer program code which, when executed by the at least one processor, causes the apparatus to: provide one or more primary audio signals based on signals from one or more first microphones associated with an audio capture device; provide one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers; and modify one or both of the primary and secondary audio signals such that output of the one or more primary audio signals are distinguished over output of the one or more secondary audio signals.

BRIEF DESCRIPTION OF DRAWINGS

Example embodiments will now be described, by way of non-limiting example, with reference to the accompanying drawings, in which.

DETAILED DESCRIPTION

Figure 1:
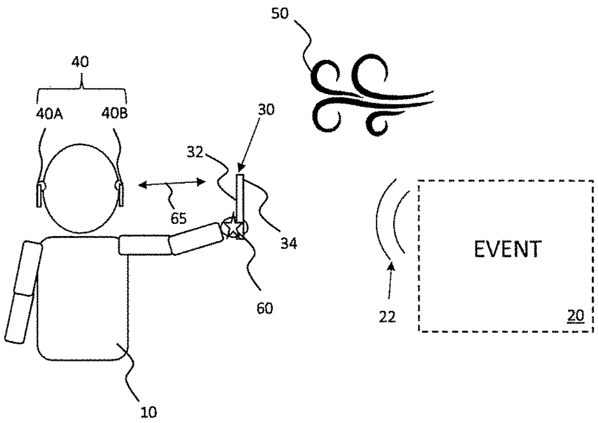
FIG. 1 shows a scenario which includes a user operating an audio capture device and monitoring the captured audio.

Example embodiments may relate to an apparatus, method and computer program relating to monitoring of audio signals, for example audio signals representing what is being captured by an audio capture device.

It may be desirable to monitor in real-time or near real-time at least an indication of audio signals being captured by an audio capture device comprising one or more microphones. For example, it may be that environmental noise such as wind or similar is being picked-up by the one or more microphones, and is being captured without the user necessarily realising. Handling noise, due to movement of the user's hand on the audio capture device, may also not be apparent to the user during capture. For this reason, the user may wish to monitor in real-time, or near real-time, what is being captured through use of one or more loudspeakers of another device, namely an audio monitoring device, in order that the user can react to avoid or mitigate the unwanted noise.

The monitoring may provide a form of real-time, or near real-time feedback that may prompt and thereafter guide the user to change the position and/or handling of the audio capture device such that the resulting captured audio content has little or no unwanted noise. However, the user does not necessarily know if the noise comprises noise on audio signals (hereafter "primary audio signals") based on signals received or picked-up by one or more microphones associated with the audio capture device, or noise-like audio signals (hereafter "secondary audio signals") based on signals received or picked-up by one or microphones associated with the audio monitoring device.

The term "based on" is indicative that some signal processing may be performed at the audio capture device and/or the audio monitoring device after reception of audio signals by the one or more microphones.

For example, the audio capture device may comprise one or more signal processing functions that are performed on signals received by its one or more microphones, such as noise cancellation, spatialization, automatic grain control and compression.

For example, the audio monitoring device may comprise one or more microphones associated with a processing function, such as noise cancellation, that may produce the one or more secondary audio signals which are audible to the user via the one or more loudspeakers at the same time as the primary audio signals. The two may be difficult to distinguish.

Example embodiments relate to modifying one or both of the primary and secondary audio signals such that output of the one or more primary audio signals are distinguished over output of the one or more secondary audio signals. This therefore gives enhanced feedback to the user.

Example embodiments relate to usage of an audio capture device and a separate audio monitoring device.

The audio capture device may comprise any device having one or more first microphones for providing one or more primary audio signals for transmission to the audio monitoring device. The audio monitoring device may comprise one or more loudspeakers for output of the one or more primary audio signals for monitoring purposes. The audio capture device may also comprise storage means for storing a representation, e.g. digital representation, of the one or more primary audio signals. The storage means may comprise any suitable means of data storage, e.g. one or more memory modules such as, but not limited to, solid state memory, a hard disk drive and/or a removable memory card or module. In some embodiments, the audio capture device may transmit the primary audio signals to an external storage system or device as another form of memory module.

The audio capture device may comprise, but is not limited to, a smartphone, digital assistant, digital music player, personal computer, laptop, tablet computer or a wearable device such as a smartwatch. The audio capture device may also comprise one or more decoders for decoding the audio data into a format appropriate for output by the loudspeakers of the audio monitoring device.

The audio capture device may be capable of establishing a communication session with other devices, such as the audio monitoring device, using a wired or wireless communications channel. The user device may comprise means for short-range wireless communications using, for example, Bluetooth, Zigbee or WiFi. Given the real-time, or near real-time monitoring nature that is envisaged, the wireless communication channel may use low latency technology, such as by use of Bluetooth 5.0 to give one example.

The audio capture device may also comprise a display screen and/or one or more control buttons. The display screen may be touch-sensitive. The audio capture device may comprise one or more antennas for communicating with external devices, including the audio monitoring device.

The audio monitoring device may comprise any device having one or more loudspeakers for output of the one or more primary audio signals received from the audio capture device. For example, the audio monitoring device may comprise one or more headphones, earphones, earbuds or loudspeakers of a wearable device such as a virtual reality headset. A pair of such loudspeakers may output monaural, stereoscopic and possibly spatial sound if provided in the received audio signal. In some embodiments, the audio monitoring device may comprise only one loudspeaker, e.g. forming part of a single earphone or earbud, therefore only capable of outputting monaural sound.

Example embodiments focus on the audio monitoring device being an earphones device, which term will be used hereafter. The term may be used as a generic term covering such above-mentioned examples or known equivalents. Example embodiments relate to an earphones device comprising first and second earphones. For the avoidance of doubt, embodiments may also be implemented in an earphones device comprising only one earphone.

The earphones device may also comprise one or more input transducers, for example one or more microphones. The one or more microphones may provide a means for a user wearing said earphones device to engage in, for example, a telephone call if the audio capture device has such functionality. The one or more microphones may also be associated with active noise cancellation processing (ANC) functionality that may be provided by the earphones device.

The earphones device may also comprise functionality enabling its engagement in a communication session with the audio capture device mentioned above. The earphones device may comprise one or more antennas for this purpose.

ANC functionality, sometimes referred to as active noise reduction (ANR) functionality, uses an electrical or electronic system associated with one or more microphones and one or more loudspeakers, such as those of the earphones device. The ANC system performs signal processing, for example by processing ambient sounds received by the one or more microphones in such a way as to generate a cancellation signal for output by the one or more loudspeakers. The cancellation signal, by means of destructive interference, acts to reduce or cancel the user's perception of the ambient sounds when it is output. For example, the ANC system may generate a cancellation signal which is in antiphase with received ambient sounds.

In an earphones device comprising first and second earphones, each earphone may comprise a microphone, an ANC system and a loudspeaker. For each earphone, the microphone of that earphone may receive ambient sound waves which are then converted to ambient sound signals and processed by the ANC system to generate the cancellation signal which is output by the loudspeaker of that earphone. Each earphone may therefore have independent ANC functionality. Alternatively, an ANC system common to both the first and second earphones may receive the ambient sound signals from microphones of the first and second earphones and may generate respective cancellation signals for sending back to the first and second earphones.

ANC systems may operate in a plurality of modes. For example, in a so-called feedforward mode, the ANC system may receive ambient sound signals via one or more microphones located on the outside or exterior of each earphone, generally on the side opposite that of the loudspeaker. In this way, the cancellation signal may be generated momentarily before the user hears the ambient sounds. For example, in a so-called feedback mode, the ANC system may receive ambient sound signals via one or more microphones located on the interior of each earphone, generally between the loudspeaker and the user's ear. In this way, the cancellation signal may be based on what the user will hear from the loudspeaker. For example, a so-called hybrid mode may utilize signals received from microphones located on the outside and inside of each earphone for producing the cancellation signal. In this way, benefits of the feedforward mode and feedback mode can be utilized to generate the cancellation signal. For example, the feedforward mode may be better at reducing or cancelling higher frequency signals compared with the feedback mode, but the latter may be better at reducing or cancelling signals across a wider range of frequencies.

ANC systems may also provide a hear-through mode, or transparency mode, mentioned briefly above. Similar to the above-mentioned other modes, the hear-through mode may be user selectable, for example via a user interface of the user device or by tapping a controller on the earphones device. A hear-through mode may be used in situations where the user wishes to hear at least some ambient sounds received via the one or more microphones of the one or more earphones.

A user may select which of the above ANC modes to use in a particular situation, for example via a user interface of the user device or by tapping a controller on the earphones device. For the avoidance of doubt however, example embodiments are not limited to any particular type of ANC system or to one providing the above-mentioned modes.

ANC systems may not be perfect at cancelling ambient sounds. For example, environmental noise such as wind may not be fully cancelled and some noise artefacts may still be audible in the one or more so-called secondary audio signals that, in the context of monitoring the one or more primary audio signals from the audio capture device, will not enable the user to know the source of the noise.

FIG. 1 shows a scenario which includes a user 10 operating an audio capture device 30, e.g. a smartphone, for capturing audio, and possibly video, of an event 20 which produces sound waves 22 for capture. The user 10 holds the audio capture device 30 in a particular first direction/orientation for appropriate capture. The audio capture device 30 may comprise a display screen 32 and one or more microphones 34. The audio capture device 30 may also comprise one or more cameras (not shown). Usage of the audio capture device 30 may involve the user directing the one or more microphones 34 towards the event 20 and the display screen 32 may or may not provide some indication of capture performance, as well as any video being captured if appropriate. The one or more microphones 34 receive the sound waves 22 of the event 20, and possibly other noise such as wind noise 50 and/or handling noise 60 which are collectively digitally encoded as a primary audio signal and may be stored on one or more memory modules of the audio capture device 30.

The user 10 may monitor in real-time, or near real-time, the primary audio signal using an earphones device 40 comprised of first and second earbuds 40A, 40B having respective loudspeakers. The primary audio signal may be transmitted by the audio capture device 3 over a communications channel 65, which may be a Bluetooth 5.0 or other low-latency channel, as explained above. The user 10 may therefore monitor what they perceive as being captured by the audio capture device 30 and may therefore modify the first direction/orientation, or even handling of the audio capture device, to mitigate for unwanted noise.

However, in the case that the earphones device 40 is capable of outputting through the respective loudspeakers of the earbuds 40A, 40B a secondary audio signal at the same time as the primary audio signal, then the user may not accurately perceive what is being captured. Unnecessary adjustments or adjustments that are detrimental to capture quality may therefore be made. For example, in the case that the earphones device 40 comprises an ANC system as described above, the secondary audio signal may comprise artefacts due to pick-up by the one or more second microphones 34 of wind noise or similar.

Figure 2:
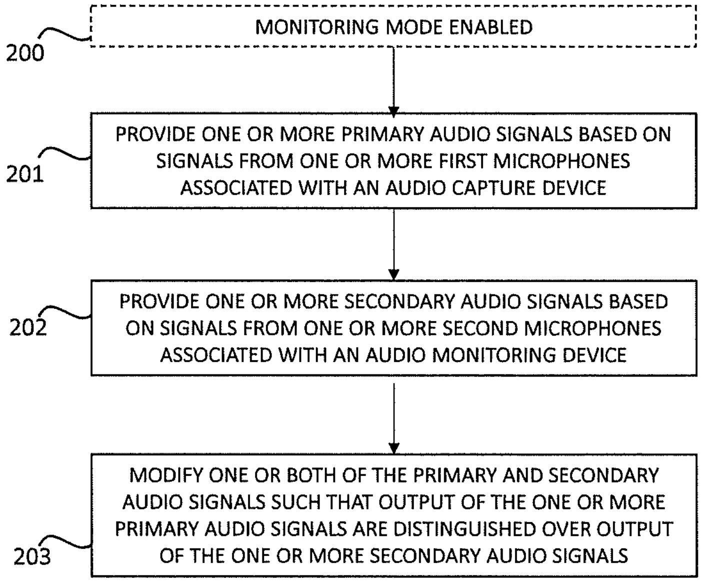
FIG. 2 is a flow diagram of processing operations according to an example embodiment.

FIG. 2 is a flow diagram indicating processing operations that may be performed, for example, by the earphones device 40 although it is possible that said operations might be performed using an external system.

The processing operations may be performed by hardware, software, firmware or a combination thereof.

A first operation 200, which may be optional, may comprise detecting enablement of a monitoring mode. That is, when the user 10 wishes to commence audio monitoring of captured audio, the monitoring mode may be enabled via, for example, a user interface of the display screen 32 and/or via a voice command detectable by the audio capture device 30. Alternatively, or additionally, the monitoring mode may be enabled based on the received level(s) of noise, for example because it crosses a predetermined threshold, and the monitoring mode may be disabled if the noise returns in the counter direction. Alternatively, or additionally, the monitoring mode may be enabled by means of the earphones device 40.

A second operation 201 may comprise providing one or more primary audio signals based on signals received from one or more first microphones associated with the audio capture device.

A third operation 202 may comprise providing one or more secondary audio signals based on signals from one or more second microphones associated with the earphones device 40, as the given example of an audio monitoring device.

A fourth operation 203 may comprise modifying one or both of the primary and secondary audio signals such that output of the one or more primary audio signals are distinguished over output of the one or more secondary audio signals.

As will be explained below, another operation may comprise monitoring one or more characteristics of one or both of the primary and secondary audio signals, wherein the modifying is triggered to temporarily modify one or both of the primary and secondary audio signals based on the monitored one or more characteristics. For example, monitoring may involve monitoring the amplitude of one or both of the primary and secondary audio signals, and triggering the modification based on the monitored amplitude of one of the primary and secondary audio signals crossing a predetermined threshold. For example, if the secondary audio signals cross the predetermined threshold, indicative of a certain level of ambient noise that cannot be removed, the modification may be triggered. The modification may be cancelled upon the monitored amplitude returning from the predetermined threshold, or due to some other detected condition, such as a cancellation input made via the display screen 32 or an associated voice command. The predetermined threshold may be a threshold relative to a corresponding characteristic of the primary audio signal. For example, modification may be triggered if the amplitude of the secondary audio signal is greater than the amplitude of the primary audio signal by a predetermined threshold at a given time.

There may be various options for modification of the primary and/or secondary audio signals to enhance the user's ability to distinguish the monitored primary audio signals over the secondary audio signals, e.g. from the ANC system.

Figure 3:
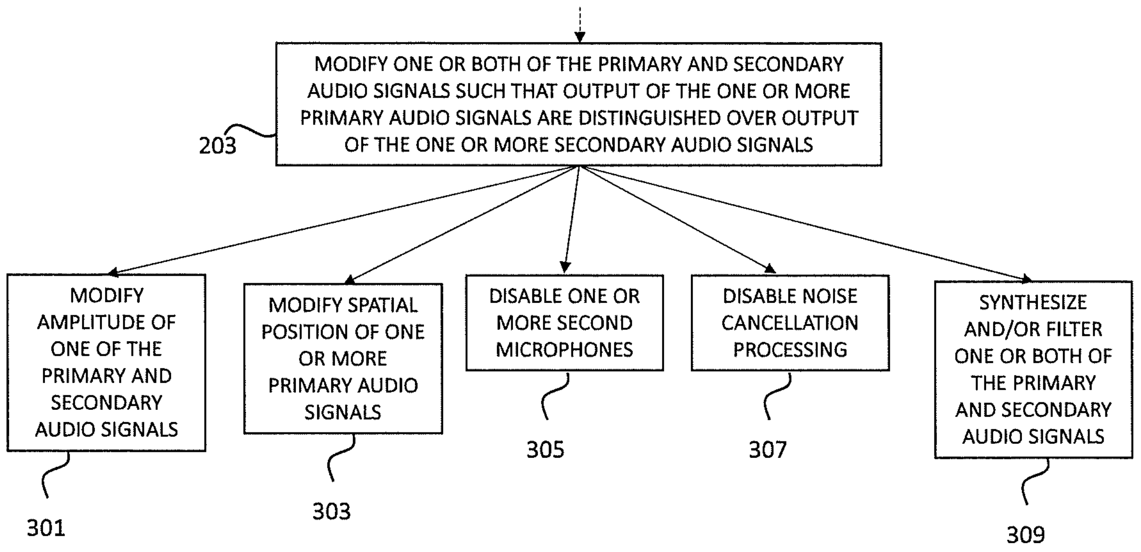
FIG. 3 is a partial flow diagram indicating example processing operations that may comprise a modifying operation indicated in the FIG. 2 flow diagram.

For example, FIG. 3 is another flow diagram which indicates modification operations that may be performed as part of fourth operation 203 the FIG. 2 process, which can be used individually or in combination.

For example, a first example modification operation 301 may comprise modifying the amplitude (volume) of one of the primary and secondary signals relative to the other one of the primary and secondary audio signals. For example, the modification operation 301 may comprise increasing the amplitude of the one or more primary audio signals relative to the amplitude of the one or more secondary audio signals. Alternatively, or additionally, the amplitude of the one or more secondary audio signals may be decreased relative to the amplitude of the one or more primary audio signals.

The first example modification operation 301 may be performed when external noise is affecting both the audio capture device 30 and the earphones device 40. The first example modification operation 301 may be performed when the amount of noise comprised by the secondary audio signal is not too loud (below a predetermined threshold, possibly relative to the primary audio signal) and the user will be able to easily identify the boosted primary audio signal.

In cases where monaural rendering is performed, e.g. through only one earbud 40A of the earphones device 40, and/or where external noise only affects the one or more second microphones 34 of the earphones device, a user interface of the display screen 32 may confirm via some visual indication that the audio capture device 30 is capturing audio without detected additional noise above a predetermined threshold.

A second example modification operation 303 may comprise modifying the spatial position of one or more of the one or more primary audio signals (or, alternatively, of the one or more secondary audio signals.) In this respect, where the one or more primary audio signals represent spatial audio, the modifying may comprise modifying the spatial position at which the one or more primary audio signals are perceived when output through the one or more loudspeakers of the earphones device 40. Moving the one or more primary audio signals may also help the user differentiate such signals against the one or more secondary audio signals.

For example, as part of the second example modification operation 303, a receiving direction associated with the one or more secondary audio signals may be determined, e.g. based on which of the first and second earbuds 40A, 40B receives the most noise, or noise above a predetermined threshold. The modifying may comprise modifying the spatial position such that the one or more primary audio signals are perceived when output through the one or more respective loudspeakers of the first and second earbuds 40A, 40B from a different direction than the receiving direction associated with the one or more secondary audio signals.

For example, as part of the second example modification operation 303, a direction or location of the audio capture device 30 relative to the earphones device 40 may be determined or it may be assumed, e.g. as substantially central relative to the earphones device, as is often the case. Modification may comprise modifying the spatial positon such that the one or more primary audio signals are perceived when output through the one or more respective loudspeakers of the first and second earbuds 40A, 40B substantially from the direction or location of the audio capture device 30.

A temporary modification of the spatial position may be combined with the amplitude modification as mentioned above in respect of the first example modification operation 301.

A third example modification operation 305 may comprise disabling the one or more second microphones 34 of the audio earphones device 40. This will remove the noise artefacts coming through said second microphones 34 and leave only the one or more primary audio signals. This effectively cancels the ANC processing functionality of the earphones device 40.

A fourth example modification operation 307 may comprise disabling ANC processing functionality of the earphones device 40, effectively to achieve the same effect as above, or alternatively to reduce the amount of ANC processing so that less noise removal is performed.

A fifth example modification operation 309 may comprise synthesizing and/or filtering one or both of the primary and secondary audio signals. This may comprise utilising one or synthesizer and/or filter modules to differentiate, for example, the one or more secondary audio signals to make them sound different whilst preserving characteristics of the original signal. For example, one or more wind noise reduction filters may be enabled for modifying the one or more secondary audio signals to make them less noticeable.

As part of the fifth example modification operation 309, there may be provided a plurality of different audio synthesis modules and/or filter modules, wherein one of the modules is selected based on one or more characteristics of one or both of the primary and secondary audio signals. For example, the one or more characteristics may be based on a type of noise detected in the secondary audio signal (e.g. wind noise, handling noise or other types of noise) and/or which audio channels are most affected.

To give an example, if one or more characteristics of the secondary audio signal are indicative of wind noise, a wind noise reduction filter may be applied to the secondary audio signal, e.g. a high-pass filter with a cut-off frequency of around 50-150 Hz to give a simple example. If the wind noise on the secondary audio signal is determined to be above a predetermined threshold, the abovementioned modification operation of disabling the one or more second microphones 34 may instead be performed.

For example, if one or more characteristics of the secondary audio signal are indicative of wind noise in only one channel, i.e. the left or right channel associated with a left and right microphone of the one or more second microphones 34, wind noise reduction may be performed only for that channel or the relevant second microphone associated with that channel may be disabled. In some example embodiments, audio signals in the non-affected channel may replace those of the affected channel thus making the secondary audio signal a monaural audio signal.

For example, if one or more characteristics of the secondary audio signal are indicative of handling noise, different noise reduction filtering and/or disabling operations may be performed in a similar way as for wind noise, but using a filter having a response appropriate to mitigating handling noise. Handling noise is in practice more likely to be in only one channel, and hence filtering and/or disabling of only one channel and/or the channel replacement operation may be more likely for this form of noise.

For example, if one or more characteristics of the secondary audio signal are indicative of noise due to ANC processing and/or pass-through operation of the ANC system, ANC processing and/or pass-through operation may be disabled. If only one channel is affected, then said ANC processing and pass-through operation may be disabled only for that channel. Similar to above, audio signals in the unaffected channel may replace those of the affected channel.

For example, if one or more characteristics of the secondary audio signal are indicative of any form of noise and one or more characteristics of the primary audio signal are indicative of little or no noise, then the primary audio signal may be converted to a monaural audio signal, and possibly made louder than the secondary audio signal, in order that the user can spatially distinguish between the primary and secondary audio signals.

For example, artificial wind noise or similar may be mixed as a monaural signal so that is separate and distinct from secondary noise which will be either left or right.

Figure 4:
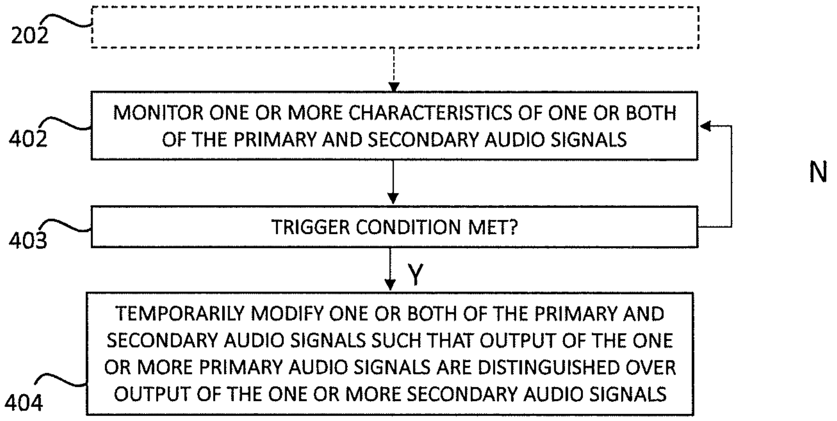
FIG. 4 is a partial flow diagram of processing operations according to another example embodiment.

FIG. 4 is another flow diagram which indicates a variation of the FIGS. 2 and 3 flow diagrams.

Following the third operation 202, a further operation 402 may comprise monitoring one or more characteristics of one or both of the primary and secondary audio signals. For example, the characteristics may comprise amplitude of one or both of the primary and secondary audio signals.

A further operation 403 may comprise determining if a predetermined trigger condition is met.

If met, a further operation 404 may comprise temporarily modifying one or both of the primary and secondary audio signals based on the monitored one or more characteristics, e.g. such that output of one of said audio signals is or are distinguished over the other said audio signal.

For example, the amplitude of one or both of the primary and secondary audio signals may be monitored and modification may be triggered based on the monitored amplitude of one of the primary and secondary audio signals crossing a predetermined threshold. By temporarily, it is meant that the modification is cancelled, either completely, or gradually, after a particular time period and/or upon detecting that the monitored one or more characteristics have returned across the threshold in the counter direction.

Figure 5:
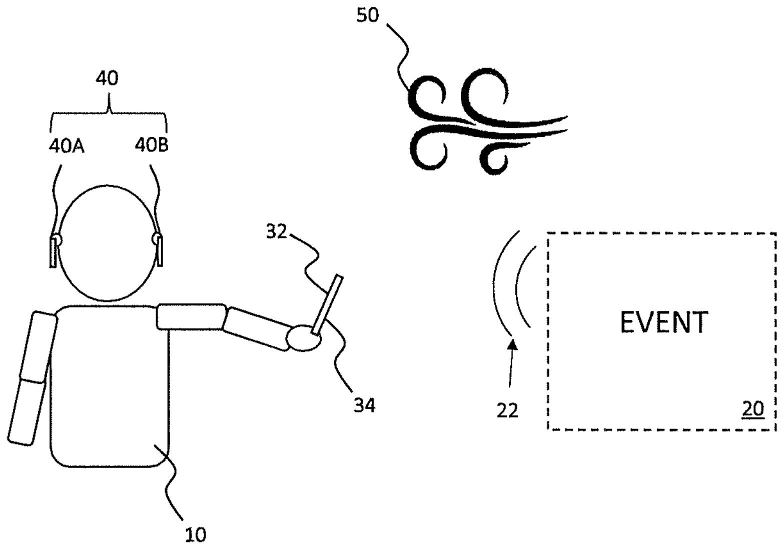
FIG. 5 shows the FIG. 1 scenario at a subsequent time.

FIG. 5 shows the FIG. 1 scenario at a different, subsequent time frame. It will be seen that the user 10 has adjusted the orientation of the audio capture device 30 based on feedback provided through the earphones device 40 in order to avoid or mitigate capture of the wind and handling noise previously experienced.

Example embodiments may therefore assist a user in monitoring captured audio, even in noisy conditions, and may utilise the distinguishing aspects described herein the adjust positioning and/or handling of the audio capture device to avoid or mitigate capturing unwanted audio such as wind or handling noise.

Example Apparatus

Figure 6:
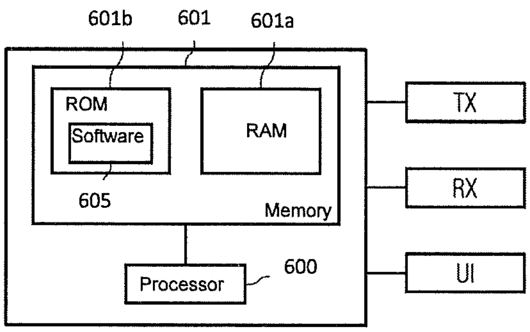
FIG. 6 is a schematic view of an apparatus that may be configured according to some example embodiments.

FIG. 6 shows an apparatus according to some example embodiments, which may comprise any of the audio capture device 30 or the earphones device 40. The apparatus may be configured to perform the operations described herein, for example operations described with reference to any disclosed process. The apparatus comprises at least one processor 600 and at least one memory 601 directly or closely connected to the processor. The memory 601 includes at least one random access memory (RAM) 601*a* and at least one read-only memory (ROM) 601*b*. Computer program code (software) 605 is stored in the ROM 601*b*. The apparatus may be connected to a transmitter (TX) and a receiver (RX). The apparatus may, optionally, be connected with a user interface (UI) for instructing the apparatus and/or for outputting data. The at least one processor 600, with the at least one memory 601 and the computer program code 605 are arranged to cause the apparatus to at least perform at least the method according to any preceding process, for example as disclosed in relation to the flow diagrams herein and related features thereof.

Figure 7:
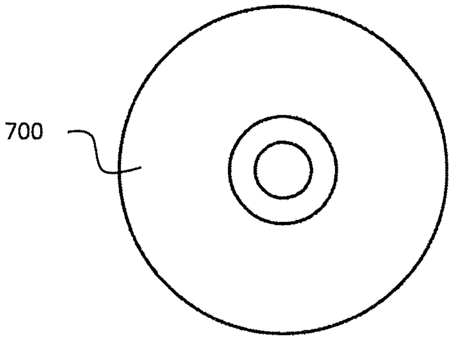
FIG. 7 is a non-transitory medium which may carry computer-readable code according to some example embodiments.

FIG. 7 shows a non-transitory media 700 according to some embodiments. The non-transitory media 700 is a computer readable storage medium. It may be e.g. a CD, a DVD, a USB stick, a blue ray disk, etc. The non-transitory media 700 stores computer program code, causing an apparatus to perform the method of any preceding process for example as disclosed in relation to the flow diagrams herein and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory module may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:

at least one processor; and at least one memory storing instructions that, when executed with the at least one processor, cause the apparatus to perform:

providing one or more primary audio signals based on signals from one or more first microphones associated with an audio capture device;

providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers;

monitoring one or more characteristics of one or both of the one or more primary audio signals or the one or more secondary audio signals; and modifying one or both of the one or more primary audio signals or the one or more secondary audio signals to temporarily modify one or both of the one or more primary audio signals or the one or more secondary audio signals based, at least partially, on the monitored one or more characteristics.

2. The apparatus of claim 1, wherein the instructions, when executed with the at least one processor, cause the apparatus to perform:

monitoring an amplitude of one or both of the one or more primary audio signals or the one or more secondary audio signals, wherein the modifying is triggered based on the monitored amplitude of one of the one or more primary audio signals or the one or more secondary audio signals crossing a predetermined threshold.

3. The apparatus of claim 1, wherein the instructions, when executed with the at least one processor, cause the apparatus to perform:

noise cancellation processing on the signals from the one or more second microphones, the one or more secondary audio signals representing artefacts of the noise cancellation processing which are audible through the one or more loudspeakers.

4. The apparatus of claim 3, wherein the instructions, when executed with the at least one processor, cause the apparatus to perform:

disabling noise cancellation processing.

5. The apparatus of claim 1, wherein the instructions, when executed with the at least one processor, cause the apparatus to perform:

disabling the one or more second microphones.

6. The apparatus of claim 1, wherein the instructions, when executed with the at least one processor, cause the apparatus to perform:

modifying an amplitude of one of the one or more primary audio signals or the one or more secondary audio signals relative to an amplitude of the other one of the one or more primary audio signals or the one or more secondary audio signals.

7. The apparatus of claim 6, wherein the instructions, when executed with the at least one processor, cause the apparatus to perform:

increasing the amplitude of the one or more primary audio signals relative to the amplitude of the one or more secondary audio signals.

8. The apparatus of claim 1, wherein the one or more primary audio signals represent spatial audio, wherein the instructions, when executed with the at least one processor, cause the apparatus to perform:

modifying a spatial position at which the one or more primary audio signals are perceived when output through the one or more loudspeakers.

9. The apparatus of claim 8, wherein the instructions, when executed with the at least one processor, cause the apparatus to perform:

determining a receiving direction associated with the one or more secondary audio signals; and modifying the spatial position such that the one or more primary audio signals are perceived when output through the one or more loudspeakers from a different direction than the receiving direction associated with the one or more secondary audio signals.

10. The apparatus of claim 8, wherein the instructions, when executed with the at least one processor, cause the apparatus to perform:

determining a direction or location of the audio capture device relative to the audio monitoring device; and modifying the spatial position such that the one or more primary audio signals are perceived when output through the one or more loudspeakers substantially from the direction or location of the audio capture device.

11. The apparatus of claim 1, wherein the instructions, when executed with the at least one processor, cause the apparatus to perform:

modifying one or both of the one or more primary audio signals or the one or more secondary audio signals with audio synthesis processing and/or with audio filtering so that at least some audio properties of one of the one or more primary audio signals or the one or more secondary audio signals is or are modified in a differentiating way to that of the other one of the one or more primary audio signals or the one or more secondary audio signals.

12. The apparatus of claim 11, wherein the instructions, when executed with the at least one processor, cause the apparatus to perform:

processing one or both of the one or more primary audio signals or the one or more secondary audio signals with a selected audio synthesis process and/or audio filter, the selection being based on characteristics of one or both of the one or more primary audio signals or the one or more secondary audio signals.

13. The apparatus of claim 1, the apparatus being the audio monitoring device.

14. A method comprising:

providing one or more primary audio signals based on signals from one or more first microphones associated with an audio capture device;

providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers;

monitoring one or more characteristics of one or both of the one or more primary audio signals or the one or more secondary audio signals; and modifying one or both of the one or more primary audio signals or the one or more secondary audio signals to temporarily modify one or both of the one or more primary audio signals or the one or more secondary audio signals based, at least partially, on the monitored one or more characteristics.

15. The method as claimed in claim 14 comprising noise cancellation processing on the signals from the one or more second microphones, the one or more secondary audio signals representing artefacts of the noise cancellation processing which are audible through the one or more loudspeakers.

16. The method as claimed in claim 14, further comprising:

monitoring an amplitude of one or both of the one or more primary audio signals or the one or more secondary audio signals, wherein the modifying is triggered based on the monitored amplitude of one of the one or more primary audio signals or the one or more secondary audio signals crossing a predetermined threshold.

17. The method as claimed in claim 14, further comprising:

disabling the one or more second microphones.

18. The method as claimed in claim 14, further comprising:

modifying an amplitude of one of the one or more primary audio signals or the one or more secondary audio signals relative to an amplitude of the other one of the one or more primary audio signals or the one or more secondary audio signals.

19. A non-transitory computer-readable medium comprising program instructions stored thereon for performing at least the following:

providing one or more primary audio signals based on signals from one or more first microphones associated with an audio capture device;

providing one or more secondary audio signals based on signals from one or more second microphones associated with an audio monitoring device, the audio monitoring device being separate from the audio capture device and configured for output of the one or more primary audio signals and the one or more secondary audio signals through one or more loudspeakers;

monitoring one or more characteristics of one or both of the one or more primary audio signals or the one or more secondary audio signals; and modifying one or both of the one or more primary audio signals or the one or more secondary audio signals to temporarily modify one or both of the one or more primary audio signals or the one or more secondary audio signals based, at least partially, on the monitored one or more characteristics.

20. The non-transitory computer-readable medium as claimed in claim 19, further comprising program instructions stored thereon for performing:

noise cancellation processing on the signals from the one or more second microphones, the one or more secondary audio signals representing artefacts of the noise cancellation processing which are audible through the one or more loudspeakers.

* * * * *